(12) United States Patent
Mack et al.

(10) Patent No.: US 6,872,330 B2
(45) Date of Patent: Mar. 29, 2005

(54) CHEMICAL MANUFACTURE OF NANOSTRUCTURED MATERIALS

(75) Inventors: Julia J Mack, Los Angeles, CA (US); Lisa M. Viculis, Los Angeles, CA (US); Richard B Kaner, Pacific Palisades, CA (US)

(73) Assignee: The Regents of the University of California, Oakland, CA (US)

( * ) Notice: Subject to any disclaimer, the term of this patent is extended or adjusted under 35 U.S.C. 154(b) by 349 days.

(21) Appl. No.: 10/160,985

(22) Filed: May 30, 2002

(65) Prior Publication Data

US 2003/0224168 A1 Dec. 4, 2003

(51) Int. Cl.$^7$ .............................................. C01B 31/04
(52) U.S. Cl. .................................. 252/378 R; 423/448
(58) Field of Search ....................... 423/448; 252/378 R

(56) References Cited

U.S. PATENT DOCUMENTS

| | | | |
|---|---|---|---|
| 3,434,917 A | * 3/1969 | Kraus et al. .................... | 162/3 |
| 5,186,919 A | 2/1993 | Bunnell ...................... | 423/448 |
| 5,330,680 A | * 7/1994 | Sakawaki et al. ........... | 252/309 |
| 6,287,694 B1 | 9/2001 | Zaleski et al. .............. | 428/402 |

OTHER PUBLICATIONS

M. Stanley Whittingham, *Intercalation Chemistry: An Introduction*, Academic Press, Inc. 1982. pp. 1–19.

Raymond E. Schaak and Thomas E. Mallouk, *Prying Apart Ruddlesden—Popper Phases: Exfoliation into Sheets and Nanotubes for Assembly of Perovskite Thin Films*, American Chemical Society, vol. 12, No. 11, 2000, p 3427–3434.

Raymond E. Schaak and Thomas E. Mallouk, *Exfoliation of Layered Rutile and Perovskite Tungstates*, Chem. Commun., Mar. 4, 2002, p 706–707.

M. Stanley Whittingham, *Intercalation Chemistry*, Academic Press, 1982, p 18–53.

Yadong D. Li, et al, *Artifical Lamellar Mesostructures to $WS_2$ Nanotubes*, J. Am. Chem. Soc. vol. 124, No. 7, Feb. 2002, p 1411–1416.

Geoffrey B. Saupe, et al, *Nanoscale Tubules Formed by Exfoliation of Potassium Hexaniobate*, Chem. Mater., May 11, 2000, 12, p 1556–1562.

Erica B. Mackie, et al, *Productiono of $WS_2$ Nanotubes by an Activation Method*, Adv. Mater. 2000, 12, No. 7, p 495–498.

Zhongfen Ding, et al, *Intercalation and Solution Processing of Bismuth Telluride and Bismuth Selenide*, Adv. Mater. 13, No. 11, Jun. 5, 2001, p 797–800.

* cited by examiner

*Primary Examiner*—Stuart Hendrickson
(74) *Attorney, Agent, or Firm*—Koppel, Jacobs, Patrick & Heybl; Michael J. Ram

(57) ABSTRACT

A low temperature chemical route to efficiently produce nanomaterials is described. The nanomaterials are synthesized by intercalating ions into layered compounds, exfoliating to create individual layers and then sonicating to produce nanotubes, nanorods, nanoscrolls and/or nanosheets. It is applicable to various different layered inorganic compounds (for example, bismuth selenides/tellurides, graphite, and other metal complexes, particularly transition metal dichalcogenides compounds including oxygen, sulfur, tellurium or selenium).

16 Claims, 6 Drawing Sheets

1

CHEMICAL MANUFACTURE OF NANOSTRUCTURED MATERIALS

The invention is directed to a process for the formation of nanotubes, nanorods and nanoscrolls of various inorganic materials or compounds. In particular, the invention is directed to the formation of carbon nanoscrolls.

BACKGROUND

The structure of multi-walled carbon nanotubes was originally reported by Iijima, (Iijima, S. "Helical Microtubules of Graphitic Carbon." Nature 354, 56–58 (1991)) to be comprised of concentric single-walled tubes, known as the Russian doll model. Most growth mechanisms involve the dissolution of carbon and subsequent growth from transition metal catalyst particles at high temperatures. (Amelinckx, S., et al. "A Formation Mechanism for Catalytically Grown Helix-shaped Graphite Nanotubes." Science 265, 635–639 (1994)). The size of the catalyst dictates the diameter of the carbon nanotubes produced. An alternative theory suggests that multi-walled nanotubes could form via a scrolling mechanism. (Amelinckx, S., Bernaerts, D., Zhang, X. B., Van Tendeloo, G., Van Landuyt, J. "A Structure Model and Growth Mechanism for Multishell Carbon Nanotubes." Science 267, 1334–1338 (1995), Zhou, O., et al. "Defects in Carbon Nanostructures." Science 263, 1744–1747 (1994)).

Since transmission electron microscopy is a two-dimensional projection of a three-dimensional object, one cannot generally distinguish between nanoscrolls and nanotubes by direct observation. In fact, a scrolling mechanism would explain the odd number of carbon layers often seen when counting parallel carbon layers at 3.4 Å spacings in transmission electron micrographs. (Amelinckx, S., et al, ibid Science 267, 1334–338 (1995)). The concept that scrolling could potentially lead to nanotube-like structures gave us the inspiration to extend our recent work on making colloidal suspensions of layered compounds (Ding, Z., Viculis, L., Nakawatase, J., Kaner, R. B. "Intercalation and Solution Processing of Bismuth Telluride and Bismuth Selenide. Adv. Mater. 13, 797–800 (2001)) to Graphite.

The discovery of fullerenes (Kroto, H. W., Heath, J. R., O'Brien, S. C., Curl, R. F., Smalley, R. E. "C-60:Buckminsterfullerene", Nature, 318, pp 162–163 (1985)) and carbon nanotubes (Iijima, S., "Helical Microtubules Of Graphitic Carbon", Nature, 354 pp 56–58 (1991)) has sparked extensive research efforts into applications of nanomaterials (Yakobson, B. I., Smalley, R. E., "Fullerene Nanotubes: C-1000000 and Beyond", American Scientist, 85, pp 324–337 (1997); Subramoney, S., "Novel Nanocarbons—Structure, Properties, and Potential Applications", Adv. Mater., 10, pp 1157–1171 (1998)). Proposed uses include composite reinforcements (Schaffer, M. S. P., Windle, A. H., "Fabrication and Characterization of Carbon Nanotube/poly (vinyl alcohol) Composites", Adv. Mater., 11, pp 937–941 (1999)), hydrogen storage (Ye, Y., Ahn, C. C., Witham, C., Fultz, B., Liu, J., Rinzler, A. G., Colbert, D., Smith, K. A., Smalley, R. E., "Hydrogen Absorption And Cohesive Energy Of Single-Walled Carbon Nanotubes", App. Phys. Lett., 74, pp 307–2309 (1999); Liu, C., Fan, Y. Y., Liu, M., Cong, H. T., Cheng, H. M., Dresselhaus, M. S., "Hydrogen Storage In Single-Walled Carbon Nanotubes At Room Temperature", Science, 286, pp 1127–1129 (1999); Kong, J., Chapline, M. G., Dai, H., "Functionalized Carbon Nanotubes For Molecular Hydrogen Sensors", Adv. Mater. 13, 1384–1386 (2001)), supercapacitors (Aldissi, M.; Schmitz, B.; Lazaro, E.; Bhamidipati, M.; Dixon, B., "Conducting Polymers In Ultracapacitor Applications", 56th Annu. Tech. Conf.—Soc. Plast. Eng., (Vol. 2), pp 1197–1201 (1998); An, K. H.; Kim, W. S.; Park, Y. S.; Moon, J.-M.; Bae, D. J.; Lim, S. C.; Lee, Y. S.; Lee, Y. H. "Electrochemical Properties Of High-Power Supercapacitors Using Single-Walled Carbon Nanotube Electrodes", Adv. Funct. Mater. 11, pp 387–392 (2001)), catalysis (Yu, R., Chen, L., Liu, Q., Lin, J., Tan, K.-L., Ng, S. C., Chan, H. S. O., Xu, G.-Q.,Hor, T. S. A. "Platinum Deposition On Carbon Nanotubes Via Chemical Modification", Chem. Mater. 10, pp 718–722 (1998); (-Planeix, J. M.; Coustel, N.; Coq, B.; Brotons, V.; Kumbhar, P. S.; Dutartre, R.; Geneste, P.; Bernier, P.; Ajayan, P. M., "Application Of Carbon Nanotubes As Supports in Heterogeneous Catalysis", J. Am. Chem. Soc. 116, pp 7935–7936 (1994)) and nano-scale electronic devices (Tans, S. J., Verschueren, A. R. M., Dekker, C., "Room-Temperature Transistor Based On A Single Carbon Nanotube", Nature 393, pp 49–52 (1998); Bachtold, A.; Hadley, P.; Nakanishi, T.; Dekker, C., "Logic Circuits With Carbon Nanotube Transistors". Science 294 pp 1317–1320 (2001)). Most of these applications depend upon a reliable source of high-quality inexpensive nanomaterials. Since carbon nanotubes are currently synthesized using high temperature arc-discharge (Ebbeson, T. W., Ajayan, P. M. "Large Scale Synthesis Of Carbon Nanotubes", Nature 358, pp 220–222 (1992)) or laser vaporization methods (Thess, A.; Lee, R.; Nikolaev, P.; Dai, H.; Petit, P.; Robert, J.; Xu, C.; Lee, Y. H.; Kim, S. G.; Rinzler, A. G.; Colbert, D. T.; Scuseria, G. E.; Tomanek, D.; Fischer, J. E.; Smalley, R. E., "Crystalline Ropes Of Metallic Carbon Nanotubes". Science 273, pp 483–487 (1996)), their price is prohibitively high (on the order of $90 per gram or more) (Oger, G., "French Firm Hopes To Get PR Bounce Out Of Nanotubes In Tennis Rackets", Small Times, Nov. 7, 2001, http://www.smalltimes.com/document_display.cfm?document_id=2506)) which limits their use to small-scale applications, such as scanning tunneling microscopy tips.

A significant application is in the fabrication of hydrogen storage devices. The on-going depletion of our natural resources, especially fossil fuels, and worldwide environmental issues has sparked public concern over finding a clean and renewable energy source. Possible energy sources include nuclear, solar, hydro- and wind-power. The problem with all of these is that they cannot be used directly as a fuel. Hydrogen is an ideal candidate as both a fuel source and energy carrier because it is environmentally benign, highly efficient, convenient and versatile (Veziroglu, T. N. "Hydrogen Energy System As A Permanent Solution To Global Energy-Environmental Problems", Chem. Ind. 53, pp 383–393 (1999); Veziroglu, T. N., Barbir, F. "Hydrogen: The Wonder Fuel", Int. J. Hydrogen Energy 17, pp 391–401 (1992)). Eventually, hydrogen is expected to replace fossil fuels as the primary fuel for vehicles. Some of the major automobile manufacturers have committed to offering fuel cell automobiles sometime in the next few years (http://www.daimlerchrysler.com). Hydrogen can be used either in fuel cells or directly in internal combustion engines with only minor modifications.

The primary barrier for using hydrogen in vehicles is the lack of an efficient and safe storage technology. Ideally, a practical hydrogen storage unit would be lightweight, inexpensive, compact, environmentally safe and easily renewable. The Department of Energy Hydrogen Plan has set a standard for the amount of reversible hydrogen adsorption needed (Deluchi, M. "Hydrogen Fuel-Cell Vehicles (Institute of Transportation Studies", Univ. California, Davis, 1992)). The ratio of stored hydrogen weight to system weight is set at 6.5 wt % hydrogen with a volumetric density of 62 kg $H_2/m^3$. These numbers have been calculated based on a fuel cell automobile needing 3.1 kg of $H_2$ for a 500 km range (Deluchi, M. "Hydrogen Fuel-Cell Vehicles (Institute of Transportation Studies", Univ. California, Davis, 1992). Currently, no storage technology meets these requirements.

Recent reports of high levels of reversible adsorption of $H_2$ in carbon nanotubes (Dillon, A. C., Jones, K. M., Bekkedahl, T. A., Kiang, C. H., Bethune, D. S., Heben, M. J., "Storage of Hydrogen in Single-Walled Carbon Nanotubes". *Nature*, 386, pp 377–379 (1997); Ye, Y., Ahn, C. C., Witham, C., Fultz, B., Liu, J., Rinzler, A. G., Colbert, D., Smith, K. A., Smalley, R. E., "Hydrogen Adsorption and Cohesive Energy of Single-Walled Carbon Nanotubes". *App. Phys. Lett.* 74, pp 2307–2309 (1999); Liu, C., Fan, Y. Y., Liu, M., Cong, H. T., Cheng, H. M., Dresselhaus, M. S. "Hydrogen Storage in Single-Walled Carbon Nanotubes at Room Temperature". *Science*, 286, pp 1127–1129 (1999)), alkali-doped graphite and pure and alkali-doped nanofibers, (Chambers, A., Park, C., Baker, R. T. K., Rodriguez, N. M. "Hydrogen Storage in Graphite Nanofibers". *J. Phys. Chem. B*, 102, pp 4253–4256 (1998); Chen, P., Wu, X., Lin, J., Tan, K. L. "High H-2 Uptake By Alkali-Doped Carbon Nanotubes Under Ambient Pressure And Moderate Temperatures", *Science*, 285, pp 91–93 (1999)) have sparked great excitement. The field accelerated in 1997 with the first report of single-walled carbon nanotubes with high reversible hydrogen storage capacity (Dillon, A. C., Jones, K. M., Bekkedahl, T. A., Kiang, C. H., Bethune, D. S., Heben, M. J., "Storage Of Hydrogen In Single-Walled Carbon Nanotubes", *Nature*, 386, pp 377–379 (1997)). A hydrogen adsorption of 5–10 wt % was extrapolated for single-walled carbon nanotubes at 133_K from as-prepared arc evaporated carbon soot containing only 0.1–0.2 wt % nanotubes. A later report by another group showed an H:C ratio of 1.0 (8 wt %) for crystalline ropes of single-walled carbon nanotubes at 80 K and pressures greater than 12 MPa (Ye, Y., Ahn, C. C., Witham, C., Fultz, B., Liu, J., Rinzler, A. G., Colbert, D., Smith, K. A., Smalley, R. E., "Hydrogen Adsorption And Cohesive Energy Of Single-Walled Carbon Nanotubes", *App. Phys. Lett.*, 74, pp 2307–2309 (1999)).

Treated graphite nanofibers in the form of tubules, platelets and herringbone structures have a reported hydrogen adsorption in excess of 11, 45 and 67 wt %, respectively, at room temperature and pressure of 12 MPa (as yet unconfirmed) (Chambers, A., Park, C., Baker, R. T. K., Rodriguez, N. M., "Hydrogen Storage In Graphite Nanofibers", *J. Phys. Chem. B*. 102, pp 4253–4256 (1998)). Lithium-doped multi-walled nanotubes under ambient pressures have a hydrogen uptake of 20 wt % but are chemically unstable (Chen, P., Wu, X., Lin, J., Tan, K. L. "High H-2 Uptake By Alkali-Doped Carbon Nanotubes Under Ambient Pressure And Moderate Temperatures". *Science*, 285, pp 91–93 (1999)). Potassium-doped multi-walled carbon nanotubes can adsorb 14 wt % hydrogen at elevated temperatures (473–673 K). However Liu, et al. studied hydrogen adsorption measurements on relatively pure samples of single-walled carbon nanotubes, (Liu, C., Fan, Y. Y., Liu, M., Cong, H. T., Cheng, H. M., Dresselhaus, M. S. "Hydrogen Storage In Single-Walled Carbon Nanotubes At Room Temperature". *Science*, 286, pp 1127–1129 (1999)). They obtained a hydrogen storage capacity of only 4.2 wt % at room temperature and a pressure of 10 MPa.

It is clear from surface area studies on conventional porous carbon materials that a correlation exists between high surface area and high hydrogen adsorption (Ye, Y., Ahn, C. C., Witham, C., Fultz, B., Liu, J., Rinzler, A. G., Colbert, D., Smith, K. A., Smalley, R. E. "Hydrogen Adsorption And Cohesive Energy Of Single-Walled Carbon Nanotubes". *App. Phys. Lett.*, 74, 2307–2309 (1999); Agarwal, R. K., Noh, J. S., Schwarz, J. A., "Effect Of Surface Acidity Of Activated Carbon On Hydrogen Storage", *Carbon*, 25, pp 219–226 (1987)). This is not strictly the case for carbon nanotubes and nanofibers where nanostructure and nanopore size may play a more important role in adsorption. Physical studies have concluded that hydrogen is stored in carbon nanotubes both inside the tubes and in interstitial sites between adjacent tubes (Dresselhaus, M. S., Williams, K. A., Eklund, P. C. "Hydrogen Adsorption In Carbon Materials", *MRS Bull.*, 24, pp 45–50 (1999)). This can lead to a higher storage density than planar graphite. Another factor related to adsorption is the nanopore size. The kinetic diameter of hydrogen is 2.89 Å, therefore the tube diameters and interplanar spacing of graphite sheets should allow for facile entry and exit of hydrogen molecules (Chambers, A., Park, C., Baker, R. T. K., Rodriguez, N. M., "Hydrogen Storage In Graphite Nanofibers", *J. Phys. Chem. B*, 102, pp 4253–4256 (1998)). Density functional calculations have been performed in order to determine whether hydrogen storage in carbon nanotubes is by physisorption or chemisorption (Lee, S. M., Lee, Y. H., "Hydrogen Storage In Single-Walled Carbon Nanotubes". *Appl. Phys. Lett.*, 76, pp 2877–2879 (2000)). It is believed that hydrogen is adsorbed via a chemisorption pathway and it has been predicted that hydrogen storage in nanotubes could exceed 14 wt % or 160 kg $H_2/m^3$, numbers well above that needed for commercial applications. Clearly, a low-cost method for mass production of suitable nanocarbon materials needs to be perfected so that hydrogen can be realized as the fuel of choice.

Another major application for nanostructured materials is in the formation of nanoelectronic components. Electrochemical capacitors are becoming increasingly important for both military and commercial applications needing both high power density and high energy density. High energy density relative to traditional capacitors enables uses such as burst power sources for the signal generation of electronic components. Since supercapacitors also have higher power density than batteries, they can be used to run power plants efficiently by rapidly storing excess energy produced at night and rapidly releasing it during peak demand hours of the day. Supercapacitors can store large amounts of energy via charge separation in the double layer formed within the microstructure and nanopores of high surface area material. The charge separation is distributed throughout the electrode volume in the double layer formed at the interface between the two electrodes.

An electrochemical capacitor is constructed like a battery, however in a capacitor both electrodes are generally made from the same material. The current flowing from any electrode is accounted for by Faradaic reactions, surface charge transfer and/or charging of the double layer. In a battery, most charge is stored via Faradaic reactions, while in a capacitor essentially all the charge is stored in the double layer (Shukla, A. K.; Sampath, S.; Vijayamohanan, K., "Electrochemical Supercapacitors: Energy Storage Beyond Batteries", *Curr. Sci.*, 79, pp 1656–1661 (2000)). Ions from the electrolyte approach the electrodes but do not react with them. In some cases ions can be adsorbed onto surfaces or intercalated into the electrodes. This later phenomenon enables much more charge to be stored relative to simple double layer capacitance. Here an additional pseudo-capacitance results from charge transfer reactions (Conway, B. E. *Electrochemical Supercapacitors*, Kluwer Academic/

Plenum, New York, (1999)). Since pseudo-capacitance is diffusion related, it will contribute to high energy density while double layer capacitance leads to high power delivery and long cycle life. The differences between and electronic capacitor, a supercapacitor, such as can be fabricated using carbon nanostructured materials, and a battery are listed in Table 1 The key requirements needed for outstanding performance is electrode conductivity and accessible surface area.

TABLE 1

CAPACITOR AND BATTERY CHARACTERISTICS

| DEVICE | ELECTRONIC CAPACITOR | SUPER CAPACITOR | BATTERY |
|---|---|---|---|
| Discharge Time | $10^{-6}$–$10^{-3}$ s | 1–30 s | 0.3–3 hr |
| Charge time | $10^{-6}$–$10^{-3}$ s | 1–30 s | 1–5 hr |
| Energy Density (W h/kg) | <0.1 | 1–10 | 20–100 |
| Power Density (W/kg) | >10,000 | 1,000–2,000 | 50–200 |
| Coulombic Efficiency | 100 | 90–95 | 70–85 |
| Cycle Life | Infinite | >100,000 | 500–2,000 |

Nanostructured materials have important applications in structural composites. The ultimate goal of composites is to make very strong, ultra-lightweight materials that can replace steel (Dai, L.; Mau, A. W. H. "Controlled Synthesis Of Modification Of Carbon Nanotubes and C60: Carbon Nanostructures For Advanced Polymeric Composite Materials", *Adv. Mater.,* 13, pp 899–913 (2001)). The weakest link in a composite material is the polymer matrix itself. The idea behind forming nanocomposites is to strengthen the preexisting polymer matrix, while maintaining its lightweight properties. Impregnating the matrix with a nanomaterial will transfer the load from the matrix to the nanomaterial (Calvert, P. "A Recipe For Strength". *Nature,* 399, pp 210–211 (1999)). Past technology has focused on using macroscopic carbon fibers that are spun into long rods, with the graphite crystallites arranged along the axis of the rod, and then imbedded in the polymer matrix (Lake, M. L.; Ting, J.-M. "Vapor Grown Carbon Fiber Composites", *Carbon Mater. Adv. Technol.* pp 139–167 (1999)). The limitation of this technique is that as strength increases, ductility is sacrificed as a result of the increased brittleness. An analogy is steel rods imbedded in concrete to reinforce it. The concrete is made stronger, but then has little flexibility. Nanocomposites utilizing the nanomaterials described herein would add strength without sacrificing flexibility.

SUMMARY

A low temperature chemical route to efficiently produce nanomaterials is described. The nanomaterials are synthesized by intercalating ions into layered compounds, exfoliating to create individual layers and then sonicating to produce nanotubes, nanorods, and/or nanoscrolls. It is applicable to various different layered inorganic compounds (for example, bismuth selenides/tellurides, graphite, and other metal complexes, particularly transition metal dichalcogenides compounds including oxygen, sulfur, tellurium or selenium). For example, the sulfides, selenides and/or tellurides of niobium, molybdenum, hafnium, tantalum, tungsten or rhenium are preferred materials. Also included are layered transition metal oxides including $TiO_2$, $V_2O_5$, $Ta_2O_5$, $Cr_3O_8$, $MoO_3$, various tungsten oxides and $MnO_2$.

Because these nanomaterials are produced in a low temperature process, surface areas are controllable through a judicious choice of intercalants, solvents and sonication conditions. This leads to an inexpensive route to nanomaterials, useful in applications such as hydrogen storage, supercapacitors, and structural composites. The materials produced are interchangeably referred to as "nanotubes" or "nanoscrolls".

The compounds can be intercalated with alkali metals (e.g. Li, Na, K, Rb, Cs), and alkaline earth metals (e.g. Mg, Ca, Sr, Ba) as well as Eu, Yb, and Ti. Intercalation of these elements can be by six different routes. First, they can be intercalated electrochemically using any nonaqueous solvent. Second, an alkali plus naphthalene or benzophenone can be used with a suitable nonaqueous solvent (usually an ether such as tetrahydrofuran). Third, amalgams (metal+mercury) can be used to intercalate the layered compounds. Fourth, any of the above mentioned metals can be intercalated by dissolving in a liquid ammonia solution to create solvated electrons. Fifth, lithium can be intercalated by using n-butyl lithium in a hydrocarbon solvent (hexane is preferable). Sixth, heat can be applied to intercalate so long as temperature is kept below the decomposition temperature for the compound.

As an example, a one-dimensional form of bismuth selenide ($Bi_2Se_3$), a thermoelectric material, can be created by intercalating lithium in the van der Waals gap between five atom thick sheets comprised of Se—Bi—Se—Bi—Se, exfoliating the structure in water to create a colloidal suspension of $Bi_2Se_3$ layers, and sonicating the suspension to form nanorods. Bismuth selenide ($Bi_2Se_3$) and/or telluride ($Bi_2Te_3$), along with its n-type derivatives (Se partially substituted for Te) or its p-type derivatives (Sb partially substituted for Bi) can be intercalated with lithium by electrochemical methods, liquid ammonia, heat, n-butyl lithium in hydrocarbon solvent (preferably hexane), alkali naphthalide in an ether, or amalgams.

In a preferred embodiment bismuth selenide is intercalated with Li in liquid ammonia at −45° C. overnight, then exfoliate with water and sonicate for six hours with a wand immersed in the solution at 500 W. Transmission electron micrographs indicate the formation of $Bi_2Se_3$ nanorods, each nanorod having a diameter of about 40 nm and a length of 1–2 microns. Diffraction experiments demonstrate that the $Bi_2Se_3$ rods are single crystals.

The generality of this synthetic technique has been shown by intercalation/exfoliation experiments with molybdenum diselenide, a layered compound composed of three atom thick Se—Mo—Se sheets. Intercalation of lithium into every layer followed by exfoliation and sonication leads to nanorods with high aspect ratios. Molybdenum diselenide is intercalated with lithium via a liquid ammonia solution at −45° C. overnight. The intercalated material is exfoliated in ethanol and then sonicated externally for 30 minutes at 80 W.

The same technique has been applied to the formation of carbon nanostructured materials. Graphite was heated to 200° C. in an evacuated tube in the presence of potassium to form a first stage intercalation compound. Exfoliation in ethanol then creates a dispersion of carbon sheets that upon sonication curl into nanotube-like structures. Transmission electron micrographs reveal the curling process and high aspect ratio of the carbon nanoscrolls.

More particularly, graphite can be intercalated with alkali (Li, Na, K, Rb, Cs), alkaline earth (Ca, Ba, Sr), or lanthanide metals (Eu, Yb, Sm, Tm) by six different methods. First, the larger alkali metals (K, Rb, Cs) intercalate readily by heating at 200° C. Lithium can be intercalated but only at higher temperatures and/or pressures. Sodium intercalation is difficult, but can be accomplished using high reaction temperatures (500–600° C.) for several weeks. Intercalation using the alkaline earth (Ca, Ba, Sr) or lanthanide metals (Eu, Yb, Sm, Tm) also requires high temperatures and long reaction times (similar to lithium intercalation). The ease of intercalation depends on the metal's ionization potential. The ionization potentials of K (4.34 eV), Rb (4.18 eV) and Cs (3.89 eV) lie below the electron affinity of graphite (4.6 eV), whereas the ionization potentials of Li (5.39 eV) and Na (5.14 eV) lie somewhat above. The first ionization potentials of the alkaline earth and lanthanide metals (Ca, Ba, Sr, Eu, Yb, Sm, Tm) all lie above the electron affinity of graphite and therefore require long reaction times and high temperatures. Second, graphite can be intercalated electrochemically using any nonaqueous solvent. Third, an alkali plus naphthalene or benzophenone can be used with a suitable nonaqueous solvent (usually an ether such as tetrahydrofuran). Fourth, amalgams (metal+mercury) can be used to intercalate the layered compounds. Fifth, any of the above mentioned metals (except Li and Na) can be intercalated by dissolving in a liquid ammonia solution to create solvated electrons. Lastly, lithium can be intercalated by using n-butyl lithium in a hydrocarbon solvent (hexane is preferable). It is preferred to intercalate graphite with potassium at 200° C. or higher for several hours. The intercalated material is exfoliated using any aqueous solvent and then sonicated at 500 W for an hour. While this is the preferred sonication procedure, any level and time will produce some scrolling, albeit to a lesser degree.

Any solvent that contains water can be used for exfoliation, including organic solvents that have not been thoroughly dried. This includes water, alcohols, or other hydroxylic solvents (including carboxylic acids), or any combination thereof. However a dry, nonaqueous solvents (e.g. dry THF) does not appear to act as an exfoliating agent.

The process of carbon scrolling is unique and has not been reported in the literature, although the scrolling process has been mentioned as a possible route to nanotubes. The bismuth selenide nanostructured materials are also unique. Scrolled transition metal chalcogenides have been previously reported in the literature; however they were synthesized by other means, namely, use of a surfactant followed by heating (Dai, H. J., Hafner, J. H., Rinzler, A. G., Colbert, D. T., Smalley, R. E. "Nanotubes as Nanoprobes in Scanning Tunnel Microscopy." *Nature* 384, 147–150 (1996)). Sonication appears to be the best method to convert a colloidal suspension of individual sheets to nanoscrolls. It should be noted that there are many publications to forming graphite flakes, which are orders of magnitude larger in size, i.e. not nanostructures, (Wong, S. S., Joselevich, E., Woolley, A. T., Cheung, C. L., Lieber, C. M. "Covalently Functionalized Nanotubes as Nanometre-sized Probes in Chemistry and Biology." *Nature* 394, 52–55 (1998); Schaffer, M. S. P., Windle, A. H. "Fabrication and Characterization of Carbon Nanotube/Poly(vinyl alcohol) Composites." *Adv. Mater.* 11, 937–941 (1999); Ye, Y., et al "Hydrogen Absorption and Cohesive Energy of Single-Walled Carbon Nanotubes. *App. Phys. Lett.* 74, 2307–2309 (1999)).

The nanomaterials produced by this new intercalation/exfoliation/sonication process are useful for several applications including hydrogen storage, electronic devices, supercapacitors, catalysis, battery electrodes and high strength structural composites. High surface-area carbon nanomaterials are believed to have a high volume hydrogen uptake for use in efficient, non-polluting engines and as supercapacitors for delivering high power and high energy density.

These methods are also readily applicable to form structural composites, taking advantage of the several order of magnitude increase in strength predicted for carbon nanotubes (Wong, E. W.; Sheehan, P. E.; Lieber, C. M. "Nanobeam Mechanics: Elasticity, Strength, And Toughness Of Nanorods And Nanotubes", *Science*, 277, pp 1971–1975 (1997)) over carbon fibers. Carbon fibers are now widely used for lightweight, high strength applications including tennis rackets, golf clubs and airplane skins. (Lake, M. L.; Ting, J.-M. "Vapor Grown Carbon Fiber Composites", *Carbon Mater. Adv. Technol.*, pp 139–167 (1999)).

DRAWINGS

These and other features, aspects and advantages of the present invention will become better understood with reference to the following description, appended claims and accompanying drawings, where:

DETAILED DISCUSSION

Synthesis of Bismuth Telluride and Bismuth Selenide Nanorods—Bismuth selenide and bismuth telluride are layered materials composed of five atom thick anion-metal-anion-metal-anion sheets held together by weak van der Waals forces. N-type selenium doped bismuth telluride and p-type antimony doped bismuth telluride have among the highest thermoelectric figures of merit known at room temperature and are used in solid-state thermoelectric refrigerators. In principle, low-dimensionally ordered forms of these materials could possess enhanced thermoelectric properties (Hicks, L. D., Dresselhaus, M. S. "Effect Of Quantum-Well Structures On The Thermoelectric Figure Of Merit", *Phys. Rev. B*, 47, pp 12727–12731 (1993)). We have demonstrated that the reducing power of solvated electrons created when lithium is dissolved in liquid ammonia is capable of completely intercalating bismuth telluride and its n-type and p-type relatives with lithium (Ding, Z.; Viculis, L.; Cronin, S.; Koga, T.; Dresselhaus, M.; Huang, S.-C.; Kaner, R. B. "Solution Chemical Routes To Two Dimensional Bismuth Tellurides For Thermoelectric Applications", *Thin Films: Preparation, Characterization, Applications*

(eds. Soriaga, M. P. and Stickney, J.) (Kluwer Academic/Plenum). (In press.); Ding, Z., Viculis, L., Nakawatase, J., Kaner, R. "Intercalation And Solution Processing of Bismuth Telluride And Bismuth Selenide", *Adv. Mater.* 13, pp 797–800 (2001)). We have shown that exfoliation in water or alcohol leads to colloidal suspensions of 10 angstrom thick sheets of bismuth telluride/selenide. The sheets have lateral dimensions of about 100 microns as determined from dynamic light scattering.

Figure 1:
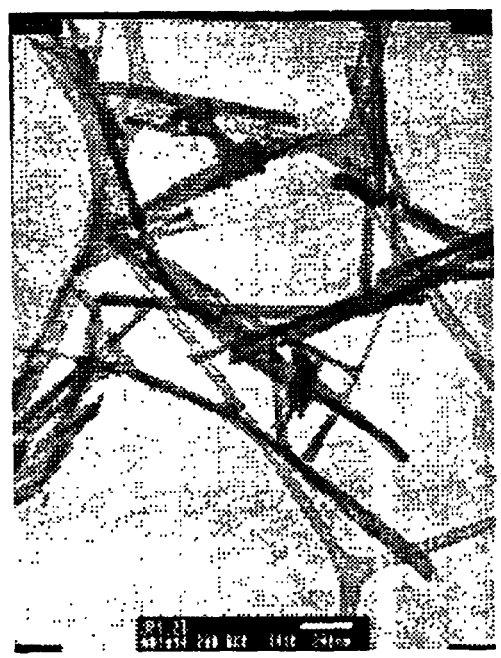
FIG. 1 is an electron transmission micrograph of bismuth selenide nanotubes made in accordance with the teachings herein.
Figure 2:
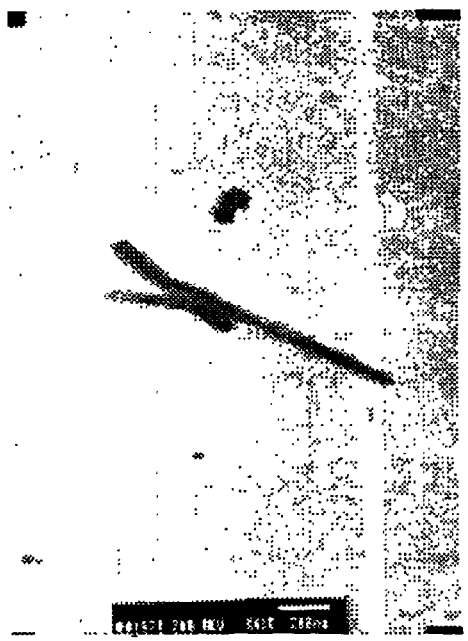
FIG. 2 is an electron transmission micrograph of an individual bismuth selenide nanotube.
Figure 3:
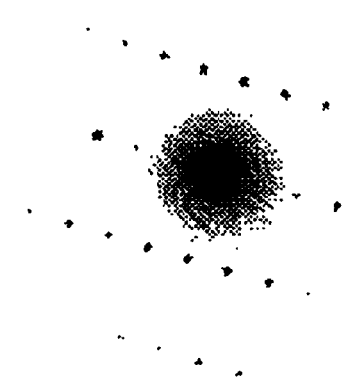
FIG. 3 is a selected area electron diffraction pattern for the nanotube of FIG. 2.

We have now discovered that applying energy to the colloids, preferably by sonication of the colloids leads to the formation of nanorods. FIG. 1 is a transmission electron micrograph (TEM) showing bismuth selenide nanorods made by the intercalation/exfoliation/sonication process. The lighter structure in the background is a lacey carbon TEM grid. These nanorods are approximately 40 nm in diameter and up to several microns in length. This high aspect ratio is highly unexpected and believed to have utility in structural composite applications as discussed herein. A TEM of an individual nanorod and its selected area electron diffraction (SAED) pattern are presented in FIGS. 2 and 3, respectively. This demonstrates that the nanorod is a single crystal with lattice parameters (a=4.00 Å, c=30.47 Å) comparable to bulk bismuth selenide. The nanorods are readily produced in high yield during sonication using a 500 W horn for 6 hours. However, the nature and quality of the nanorods produced can be varied by modifying the energy and time under which the process is carried out. Using the same procedure, nanorods of n-type selenium doped bismuth telluride and p-type antimony doped bismuth telluride nanorods can also be synthesized.

Synthesis of Carbon Nanoscrolls—This process described above is also applicable to other important layered materials such as graphite. The intercalation procedure was conducted using an alternate intercalant since lithium cannot be directly intercalated into graphite under ambient pressure due to unfavorable thermodynamics. However, potassium intercalation is preferred because the ionization potential (4.34 eV) lies below the electron affinity of graphite (~4.6 eV) (Bartlett, N. & McQuillan, B. W. *Intercalation Chemistry* (eds Whittingham, M. S. and Jacobson, A. J.) pp 19–53, Academic Press, New York, (1982)) and can be achieved readily by mild heating in an inert atmosphere.

Figure 4:
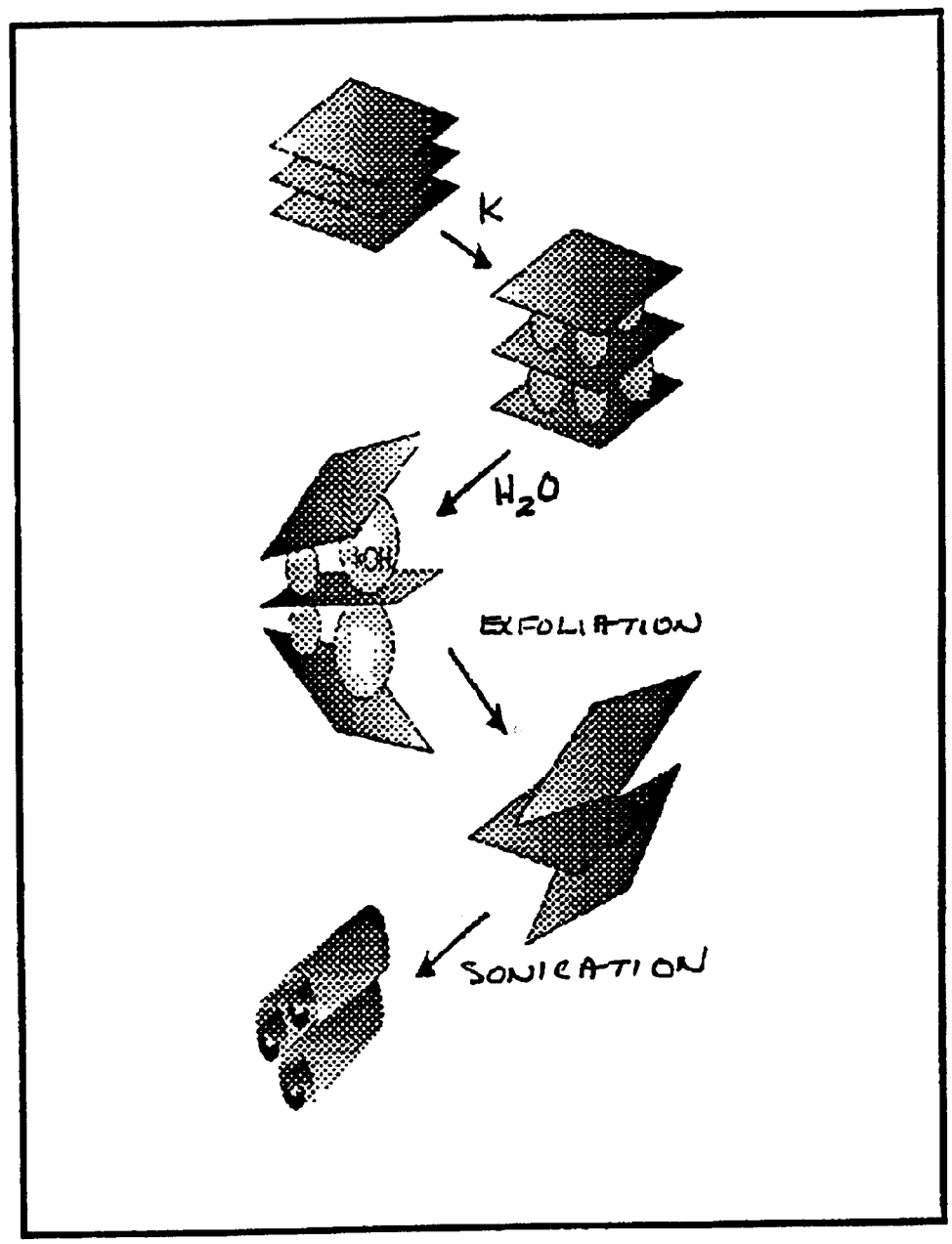
FIG. 4 is a schematic drawing showing a representative process for forming carbon nanotubes.

The process to form carbon nanoscrolls is shown schematically in FIG. 4. The first stage intercalation compound, $KC_8$, was synthesized by adding a stoichiometric amount of potassium, 81.4 mg (0.0021 moles) to 200 mg (0.0167 moles) of high purity graphite (SP-1 from Bay Carbon, Inc.) in a Pyrex tube capped with a stopcock. All transfers were carried out in a helium filled drybox (<1 ppm $H_2O$ and $O_2$). The reactant filled tube was evacuated, sealed and heated for 16 hours at 200° C. A uniform, bright gold compound formed.

Powder X-ray diffraction, carried out by covering the air sensitive sample with Scotch tape, confirmed that the only crystalline material present was the first stage intercalation compound $KC_8$. Two intense peaks are observed, centered at 16.6 and 33.5 degrees two-theta, representing the (004) and (008) diffraction lines, respectively. These peaks correspond to a c-axis expansion from 3.4 Å to 5.4 Å, consistent with potassium intercalation between every graphite layer. Even though potassium cautions possess a diameter of 3.0 Å, they force each carbon layer to align by nestling into the carbon rings both above and below them, thus accounting for the 1.0 Å smaller than expected expansion.

Potassium intercalated graphite is very air sensitive and reacts vigorously with water or alcohols causing exfoliation. Pure ethanol was found to be a very effective exfoliating agent, as given in equation 1.

$$KC_8 + CH_3CH_2OH \rightarrow 8C + KOCH_2CH_3 + \frac{1}{2}H_2 \qquad (1)$$

The intercalated graphite turns from gold to black as the sheets exfoliate. Bubbling is observed, consistent with hydrogen evolution. The resulting solution is basic due to the formation of potassium ethoxide. The dispersion of graphitic sheets in ethanol was then allowed to settle. The solvent was decanted and the product washed several times with ethanol until a neutral pH was obtained.

The graphite suspension in ethanol was sonicated with a ⅛" titanium tip 500 W sonicator (Sonics & Materials VC 500) pulsed at 45% of full power. Due to the heat generated during sonication, immersion of the sonication vessel in an ice bath was necessary to prevent evaporation of the solvent. Sonication times were varied to optimize the yield of the scrolled material. The yield of carbon nanoscrolls was calculated based on counting randomly selected grids in the transmission electron microscope (TEM).

While potassium is a preferred intercalating agent, numerous other materials may be used including, but not limited to, the other alkali metals (Li, Na, Rb, Cs), alkaline earth metals (Mg, Ca, Sr, Ba) strong acids (HCl, $H_2SO_4$) and certain transition metals (Eu, Yb, Tl, etc.). Materials suitable as intercalating compounds for carbon include Li, Na, K, Rb, Cs, Ca, Ba, Sr, Eu, Yb, Sm, Tm. The yield of carbon nanoscrolls produced by this low temperature process appears to be about 80% which is high when compared to other techniques. With a six hour sonication at 500 W a yield of approximately 60% nanoscrolled material is produced. Additional sonication time did not increase the yield. Unexpectedly, reducing the sonication time to one hour increases the yield to 82%. Lowering the power to 80 W during one hour of sonication reduces the yield to about 50%. Thus, short, high power sonication appears to give a very high yield of carbon nanoscrolled material, especially when one considers the relatively low efficiency of currently used arc evaporation methods.

Control experiments were carried out in order to determine if the exfoliation/sonication process is the key to forming carbon nanoscrolls. For a sample that was only exfoliated and not sonicated, a much smaller degree of scrolling was observed (<10%), but this may be attributed to the short sonication time (~5 min) required to prepare the TEM grid. When high purity graphite was sonicated for 6 hours without intercalation/exfoliation, the resulting TEM grid showed thick graphite plates with little or no scrolling.

Figure 5:
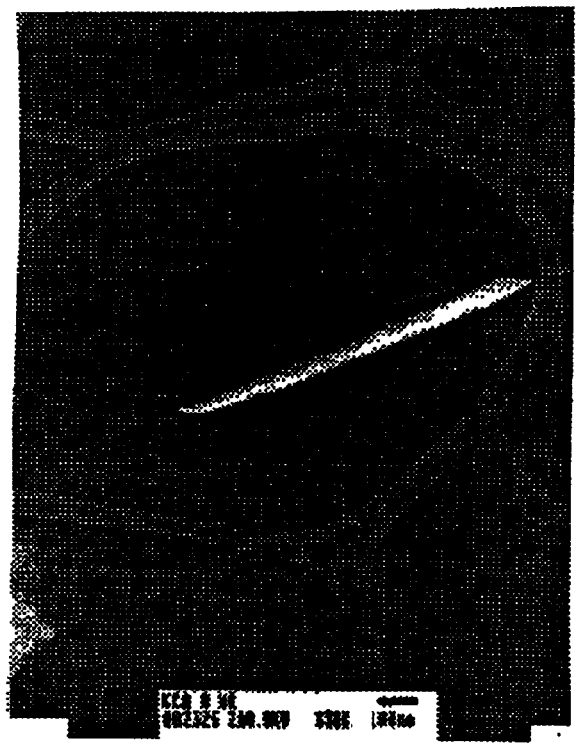
FIG. 5 is an electron transmission micrograph of a single carbon nanoscroll.
Figure 6:
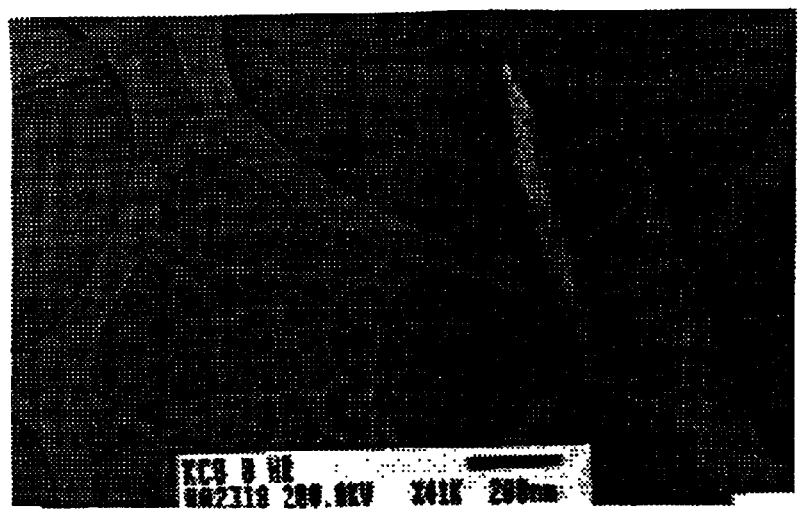
FIG. 6 is an electron transmission micrograph of a partially curled or scrolled graphite sheet.
Figure 7:
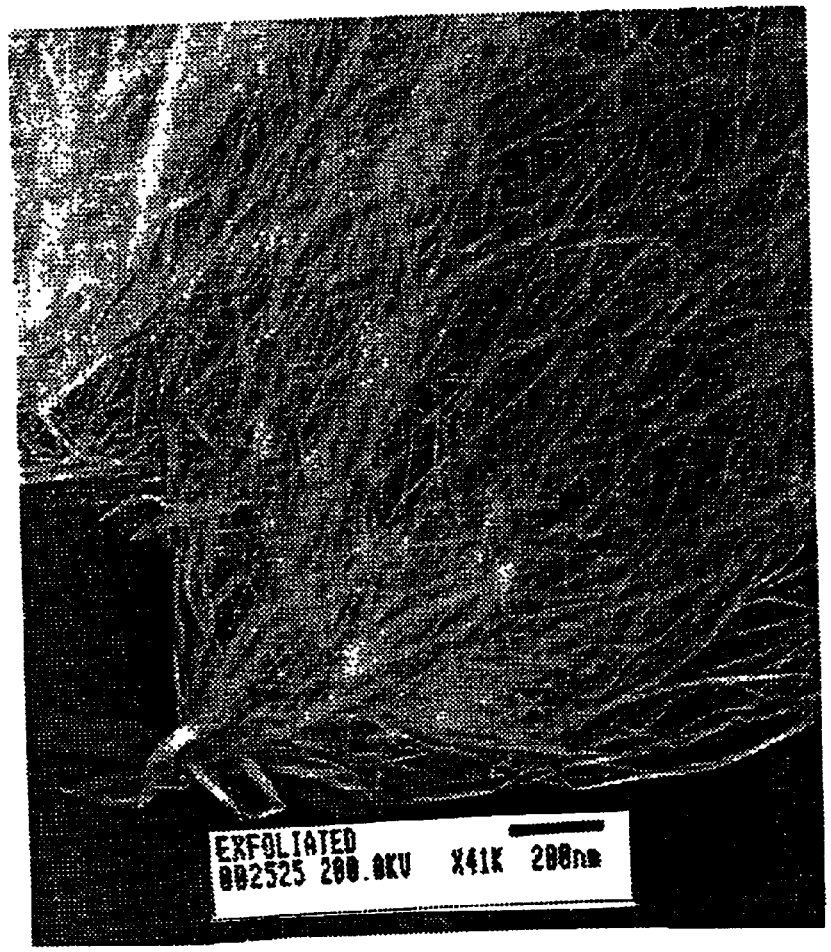
FIG. 7 is an electron transmission micrograph of a bulk sample of multiple nanoscrolls.

Typical images of the carbon nanoscrolls made by the described process are shown in FIGS. 5–7. The samples were dispersed on carbon grids using ethanol and imaged with a JEOL-2000 FX TEM. The background web pattern seen in all the electron micrographs is the lacey carbon grid support. FIG. 5 shows an isolated carbon scroll with dimensions of 100 nm×1.3 μm. Due to the brightness of the image, this scroll is likely several layers of graphite rolled into a tube. The lack of capping is due to the nature of the scrolling process. FIG. 6 shows the progression of a thin graphite sheet rolling onto itself. The scrolling has not yet resulted in a tightly wound tube, as seen in FIG. 5. FIG. 7 shows a bundled mass of graphite scrolling onto itself at all the edges. This matted material is representative of the bulk of the scrolled graphite.

Figure 8:
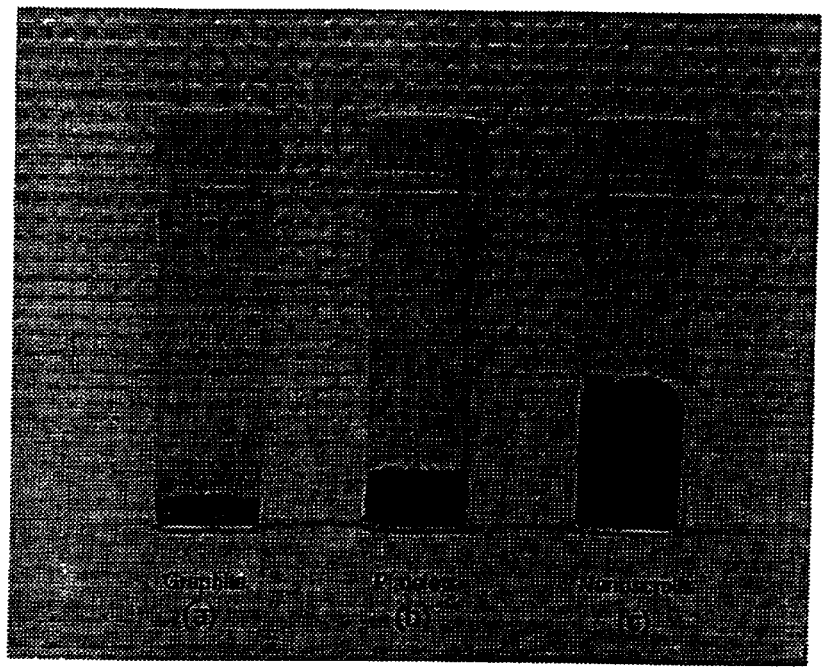
FIG. 8 is a photograph showing the volume expansion observed in formation of the nanoscrolls.

The appearance of large mats of carbon scrolls suggests that this new material may occupy a considerable volume. A significant metamorphosis of the original graphite powder can be seen in FIG. 8 where a vial containing the graphite starting material is compared to vials of carbon nanoplatelets and carbon nanoscrolls. All three containers have equal masses of carbon (0.35 g). The volume occupied by graphite (FIG. 8a) expands by two and a half times after intercalation with potassium and exfoliation with ethanol (FIG. 8b). Since exfoliation separates graphite into individual layers, removal of the solvent leads to less efficient packing and lower density. After sonication to produce the carbon nanoscrolls, a six-fold increase in volume is observed (FIG. 8c) when compared to graphite starting material. This clearly demonstrates that nanoscrolls do not pack efficiently and their calculated volume density is greatly reduced from the graphite starting material. Perfectly packed graphite has a density of 2.2 g/cm$^3$.

Figure 9:
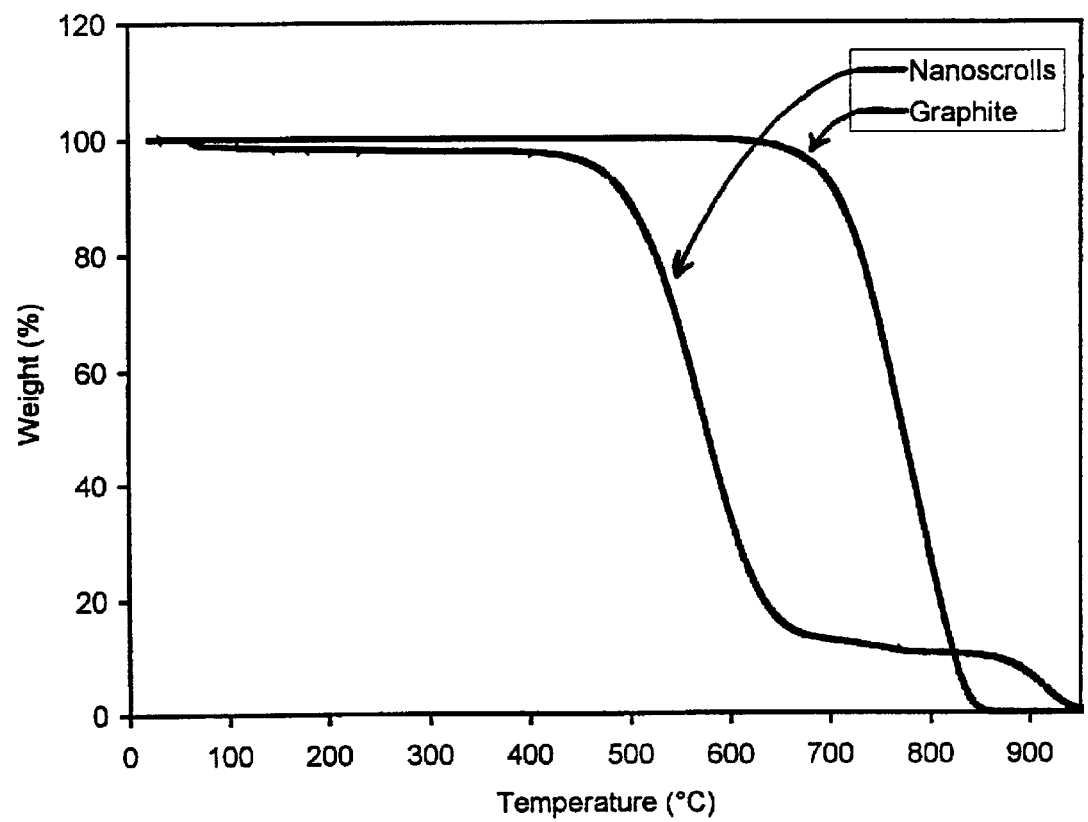
FIG. 9 is a thermalgravimetric analysis of graphite compared to carbon nanoscrolls.

Thermal stability of the carbon nanoscrolls is consistent with their reduction to nanometer diameters and increased volume, as can be seen from FIG. 9. When pure graphite is heated at 10° C. per minute in air, no weight loss is observed until 650° C., above which point carbon is continuously oxidized to carbon dioxide until none remains. The carbon nanoscrolls are stable until 450° C. As the temperature increases, they oxidize to carbon dioxide losing 83% of their mass by 650° C. Since the carbon nanoscrolls have greatly reduced van der Waals interactions compared to the starting graphite powder, a lowering of thermal stability is expected. The 17% weight lost by the carbon nanoscrolls above 650° C. may be due to residual graphitized carbon since this residue completely oxidizes by 930° C.

Carbon nanoscrolls hold on to solvents tenaciously. Even after pumping under dynamic vacuum for 72 hours, they retain 15% by weight ethanol. Therefore, the carbon nanoscrolls used for the thermal analysis were preheated to 250° C. while under dynamic vacuum for 72 hours. Even with this treatment, out-gassing is observed below the 450° C. oxidation temperature (see FIG. 9) thus precluding making BET surface area measurements on these materials. In theory, the surface area of individual carbon sheets can be up to 2630 m$^2$/g, assuming both sides of the sheet are accessible. This may be possible with carbon nanoscrolls, which have no end caps, but not possible with sealed carbon nanotubes. Therefore, these new nanostructured forms of carbon could potentially be useful as adsorbents, or for hydrogen storage when a low temperature method for removing solvent is developed.

Synthesis of Molybdenum Diselenide Nanostructured Materials—The same technique can be utilized in a similar fashion to form nanostructures of other layered compounds using intercalation/exfoliation/sonication chemistry. The intercalation chemistry of transition metal dichalcogenides is well known (*Intercalation Chemistry,* Eds Whittingham, M. S., and Jacobson, A. J., Academic Press, New York, (1982)) and these materials, such as $MoS_2$, have found applications as electrodes in lithium ion batteries (Whittingham, M. S., "Chemistry Of Intercalation Compounds: Metal Guests In Chalcogenide Hosts", *Prog. Solid St. Chem.* 12, pp 41–99 (1978)) and as hydrodesulfurization catalysts (Grange, P., Delmon, B. "Role of Cobalt And Molybdenum Sulfides In Hydrosulfurization Catlaysts. Review", *Chem. Uses Molybdenum, Proc. Conf.,* (1$^{st}$), pp 188–191 (1974)). As an example, $MoSe_2$ consists of Se—Mo—Se layers held together by weak van der Waals forces. Intercalation can be achieved by immersing $MoSe_2$ powder in a lithium/liquid ammonia solution. The solvated electrons reduce the $MoSe_2$ layers enabling Li$^+$ ions to completely intercalate into the van der Waals gap between Se—Mo—Se sheets.

Figure 10:
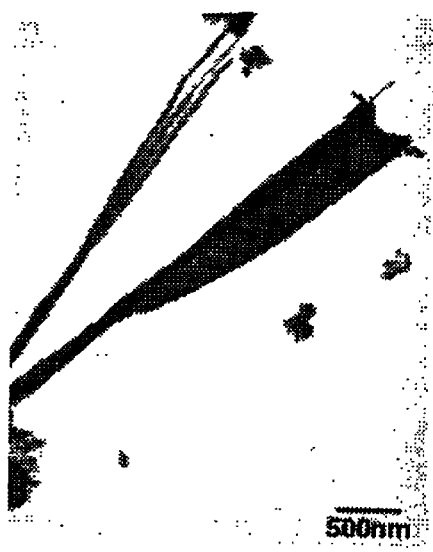
FIG. 10 is an electron transmission micrograph a $MoSe_2$ nanoscroll.

Exposure to water or alcohols results in exfoliation, producing a dispersion of $MoSe_2$ layers. Sonication for 30 minutes at 80 W then produces $MoSe_2$ nanostructured materials, as shown in FIG. 10. Nanostructures of other layered sulfides (e.g. $MoS_2$), selenides (e.g. $WSe_2$), and tellurides (e.g. $MoTe_2$) should be able to be produced in the same manner. This technique can also be employed to synthesize nanostructured materials from other layered transition metal dichalcogenides, layered transition metal dihalides (e.g. $PbI_2$), layered ternary chalcogenides with alkali metals (e.g. $A_xM_yX_z$), layered metal oxides (e.g. $V_1O_5$), layered metal oxyhalides (e.g. MOCl), and sheet silicates.

Applications—The nanotube-like structures described herein, particularly carbon nanotubes excel in providing high electrode conductivity and high accessible surface area, particularly using low temperature synthesis methods (An, K. H.; Kim, W. S.; Park, Y. S.; Moon, J.-M.; Bae, D. J.; Lim, S. C.; Lee, Y. S.; Lee, Y. H. "Electrochemical Properties Of High-Power Supercapacitors Using Single-Walled Carbon Nanotube Electrodes", *Adv. Funct. Mater.,* 11, pp 387–392 (2001); (Frackowiak, E.; Metenier, K.; Bertagna, V.; Beguin, F. "Supercapacitor Electrodes From Multiwalled Carbon Nanotubes", *App. Phys. Lett.* 77, pp 2421–2423 (2000)), thus making them particularly suitable for use as supercapacitors.

An ideal nanocomposite material would have a high aspect ratio (surface area vs. thickness) of at least 500 (Gaier, J. R.; Hambourger, P. D.; Slabe, M. E. "Resistivity Of Pristine And Intercalated Graphite Fiber Epoxy Composites", *Carbon,* 29, pp 313–320 (1991)). The carbon nanoscrolls above described can serve as excellent strength-reinforcements in polymer matrices since carbon nanotubes have been reported to have an extremely high axial Young's modulus on the order of ~1.2 TPa (Wong, E. W.; Sheehan, P. E.; Lieber, C. M. "Nanobeam Mechanics: Elasticity, Strength, And Toughness Of Nanorods And Nanotubes", *Science,* 277, pp 1971–1975 (1997)). An increase of up to 42% in the elastic modulus has already been reported with only 1 wt % multi-walled carbon nanotubes added to a polystyrene matrix (Qian, D.; Dickey, E. C.; Andrews, R.; Rantell, T. "Load Transfer And Deformation Mechanisms In Carbon Nanotube-Polystyrene Composites", *App. Phys. Lett.,* 76, pp 2868–2870 (2000)). While this is a good result, the main difficulties lie in controlling pockets of weakness due to nanotube aggregation or poor dispersion in the matrix (Schaffer, M. S. P.; Windle, A. H. "Fabrication And Characterization Of Carbon Nanotube/Poly(Vinyl Alcohol) Composites", *Adv. Mater.,* 11, pp 937–941 (1999)); (Ajayan, P. M.; Schadler, L. S.; Giannaris, C.; Rubio, A. "Single-Walled Carbon Nanotube-Polymer Composites: Strengths And Weakness", *Adv. Mater.,* 12, pp 750–753 (2000)). Although carbon nanotubes are a logical choice for polymer reinforcement, their current cost is much too high with existing production methods. The mechanical properties of the carbon nanoscrolls described herein, when embedded in a polymer matrix, will produce strong, flexible composites. Since nanotubes, other than carbon may produce high strength composites, the materials other than carbon described herein and produced by our intercalation/exfoliation/sonication method, including bismuth selenides/tellurides, layered transition metal dichalcogenides, and other layered compounds such as sheet silicates are desirable for use in composite formation.

It is evident from the foregoing that there are many additional embodiments of the present invention which, while not expressly described herein, are within the scope of this invention and may suggest themselves to one of ordinary skill in the art. In particular, while this application is primarily directed to nanoscrolls or nanotubes it has also been discovered that the intermediate product produced by exfoliation but prior to sonication, namely nanosheets or nanoplatelets of the previously layered materials, have unique structure and utility. They have particular utility as superior reinforcing materials in the formation of composites. These materials are functionally distinguishable from previously produced multilayered graphite plates that may have a tendency to delaminate when placed in composite structures. One advantage over the nanoscrolls is that the use of nanosheets eliminates the voids within the nanoscrolls that are within the composite and may not be filled with the composite matrix material. Typical dimensions of carbon sheets produced by the exfoliation process described above are approximately 3.4 Å in thickness, and from 1–2 $\mu$m by 1–2 $\mu$m in lateral dimensions. It is therefore intended that the invention be limited solely by the appended claims.

We claim:

1. A process for the formation of nanostructured materials comprising:
 a. providing a layered compound or element,
 b. causing an intercalating material to penetrate between layers of the layered compound or element to form an intercalated composition, and
 c. exfoliating the intercalated composition by placing said intercalated composition in a water or alcohol solution and forming a dispersion of nanostructures
wherein the element is carbon and the intercalating compound is selected from the group consisting of alkali metals, alkaline earth metals, Eu, Yb, Tl, Sm and Tm.

2. The process of claim 1 further including the step of delivering ultrasonic energy into the dispersion, causing the form of the dispersed nanostructures to change to a different nanostructure form wherein the nanostructured material is carbon nanoscrolls and the process comprises:
 a) mixing graphite powder with potassium and sealing the mixture in a sealed, oxygen free vessel, followed by heating at 200° C. for 16 hours to form an intercalated graphite composition,
 b) placing the intercalated graphite composition in ethanol causing the layers of intercalated graphite to exfoliate, and
 c) applying ultrasonic energy to the ethanol mixture of step (b) causing the formation of nanoscrolls.

3. The process of claim 2 wherein 80 to 500 W of ultrasonic energy is applied for 1 to 6 hours.

4. The process of claim 3 wherein the carbon nanoscrolls comprise films of graphite formed into spiral wound scrolls of about 100 nm in length and about 1.3 $\mu$m in diameter.

5. The process of claim 2 wherein the energy is provided by an ultrasound generating source delivering from about 80 W to about 500 W delivered for about 30 minutes to about 6 hours.

6. The process of claim 1 wherein the carbon is in the form of graphite.

7. The process of claim 1 further including the step of delivering ultrasonic energy into the dispersion, causing the form of the dispersed nanostructures to change to a different nanostructure form.

8. The process of claim 7 wherein the element is carbon in the form of graphite and the intercalating material is selected from the group consisting of alkali metals, strong acids, alkaline earth metals, Eu, Yb, Sm and Tm.

9. A process for the formation of nanostructured materials comprising:
 a. providing a layered compound or element,
 b. causing an intercalating material to penetrate between layers of the layered compound or element to form an intercalated composition, and
 c. exfoliating the intercalated composition by placing said intercalated composition in a solution and forming a dispersion of nanostructures
wherein the element is carbon in the form of graphite and the intercalating material is potassium.

10. The process of claim 9 wherein the intercalating material is provided as an aqueous or alcohol solution.

11. The process of claim 9 wherein the intercalating material is dissolved in water.

12. The process of claim 9 wherein the intercalating material is dissolved in an alcohol.

13. The process of claim 9 wherein the intercalating material is dissolved in ethanol.

14. A process for the formation of nanostructured materials comprising:
 a. providing a layered compound or element,
 b. causing an intercalating material to penetrate between layers of the layered compound or element to form an intercalated composition, and
 c. exfoliating the intercalated composition by placing said intercalated composition in a solution and forming a dispersion of nanostructures
wherein the layered element is carbon, the intercalating material is selected from the group consisting of Li, Na, Ki, Rb, Cs, Ca, Ba, Sr, Eu, Yb, Sm, Tm or a combination thereof and the exfoliating material is selected from the group consisting of water, water containing organic solvents, alcohols and hydroxylic solvents or a combination thereof.

15. A process for the formation of nanostructured materials wherein the nanostructured material is carbon nanosheets comprising:
 a. providing a layered compound or element,
 b. causing an intercalating material to penetrate between layers of the layered compound or element to form an intercalated composition, and
 c. exfoliating the intercalated composition by placing said intercalated composition in a solution and forming a dispersion of nanostructures, comprising
 d. mixing graphite powder with potassium and sealing the mixture in a sealed, oxygen free vessel, followed by heating at 200° C. for 16 hours to form an intercalated graphite composition, and
 e. placing the intercalated graphite composition in ethanol causing the intercalated graphite composition to exfoliate into individual layers forming carbon nanosheets.

16. The process of claim 15 wherein the carbon nanosheets formed comprise individual graphite layers having a thickness of about 3.4 Å and lateral dimensions from about to 1 $\mu$m to about 2 $\mu$m in length and from about 1 $\mu$m to about 2 $\mu$m in width.

* * * * *

UNITED STATES PATENT AND TRADEMARK OFFICE
CERTIFICATE OF CORRECTION

PATENT NO. : 6,872,330 B2
DATED : March 29, 2005
INVENTOR(S) : Julia J. Mack et al.

It is certified that error appears in the above-identified patent and that said Letters Patent is hereby corrected as shown below:

Column 1,
Line 3, add the following paragraph:

-- This invention was supported in whole or in part by Grant No. N00014-99-1-0267, U.S. Office of Naval Research. --.

Signed and Sealed this

Eleventh Day of October, 2005

JON W. DUDAS
*Director of the United States Patent and Trademark Office*